UNITED STATES PATENT OFFICE 2,077,258

SOLUBLE SILICATE BINDER AND METHOD OF MAKING AND USING THE SAME

Norman Percy Pitt, Rockcliffe, Ontario, and Alan Findlay Gill, Ottawa, Ontario, Canada No Drawing. Application June 26, 1935, Serial No. 28,488

7 Claims. (Cl. 106—9)

This invention relates to soluble silicate binders and to a method of making and using the same.

Sodium silicate, both in the wet and dry condition, has long been used as a binder for various types of materials. For example, as a binder it has been used in abrasives, refractory cements, asbestos cements and mortars for acid-proof masonry and as an adhesive in asbestos paper, wood joints, plywood, fibreboard, corrugated paper and laminated board. In suitable applications it produces a moderately strong bond, particularly after drying, and granular materials bonded with it usually have good tensile strength and modulus of rupture. Refractories bonded with sodium silicate lose much of their strength upon being heated to red heat or above.

An object of the present invention is to improve the binding properties of sodium and other soluble silicates with a view to securing higher strength in materials bonded therewith or a reduction in the amount of binder required. A further object is to increase the refractoriness of refractory materials bonded with sodium silicate and to preserve at high temperatures the strength of such refractories.

A still further object of the invention is to provide a method which may be applied during the manufacture of the silicate itself or at the time of its use or incorporation with the materials to be bonded.

It will be apparent that sodium silicate, on account of its low cost, is the water-soluble silicate to be generally used as a binder, but other soluble silicates come within the invention, although most of them are too expensive for commercial application. Potassium silicate is generally used for carbon arc pencils because of the different character of flame produced by the arc.

In accordance with the invention alkali phosphate is used in conjunction with the soluble silicate to constitute the binder for the granular or other material to be bonded together. The alkali phosphate, if to be used dry, may be pulverized and mixed with the material to be bonded, together with a dry soluble silicate, only water remaining to be added, or if preferred it may be dissolved in a liquid silicate before the latter is applied as a bond. The latter procedure is the one to be followed when the combination of soluble silicate and alkali phosphate is to be used as an adhesive, as for example in bonding sheet material. In bonding refractories and other granular materials equally good results are normally obtained by the two methods.

It has been found that with this binder the strength of the bonded material is much greater than when the soluble silicate is used alone, and further, that refractories bonded with it retain a large proportion of their strength after being heated, being much superior in this respect to those bonded with sodium silicate alone. If desired, advantage may be taken of this high strength to reduce the quantity of binder used, with a corresponding increase in refractoriness and reduction in cost. Reduction in the amount of sodium silicate used in refractories usually results in a highly desirable increase in the refractoriness of the bonded material.

While alkali phosphates are not effective as binders except when used in conjuction with soluble silicates, it is not necessary to maintain any particular ratio between them, the ratio of the alkali phosphate to the material to be bonded being normally the more important. The proportion of alkali phosphate to refractory aggregate or other material to be bonded is usually in the neighborhood of 1%, but this proportion may be varied greatly in either direction within the scope of the invention. The examples hereinafter given illustrate the ratio of alkali phosphate to soluble silicate, but it may be stated that, in general, an increase in the quantity of soluble silicate used does not require a corresponding increase in the quantity of alkali phosphate required. In practice, the percentage of alkali phosphate to be used in any given case must be decided, like that of the silicate itself, according to the strength, refractoriness and other properties desired in the bonded material, and the economic factors involved. This is illustrated in the examples hereinafter given and these also indicate the effect of different alkali phosphates, the choice of which is largely dependent upon economic factors involved. Tribasic sodium phosphate is one of the preferred compounds, as it is relatively cheap, has desirable physical properties, and gives excellent results. Other alkali phosphates which have been successfully used include the dibasic and monobasic sodium phosphates, potassium phosphates, sodium hexametaphosphate, sodium pyrophosphate and sodium glycerophosphate.

In practice the invention may be applied in a very wide field. In fact, it appears that the addition of an alkali phosphate will always improve a soluble silicate bond unless the chemical or physical nature of the material to be bonded be such as to bring about changes or reactions equivalent to the reduction or elimination of the alkali phosphate. For example, some colloidal clays bond equally well with or without the addition of alkali phosphate, but the same clays when calcined have their soluble silicate bond strengthened by the addition of alkali phosphate, as illustrated below.

The following examples are given to illustrate comparative results outlined above and as broadly indicated below.

1. Effect of additions of alkali phosphates to soluble silicate bonds for various refractories

| Composition | Modulus of rupture after heating at— | | |
|---|---|---|---|
| | 220° F. | 1200° F. | 2000° F. |
| Graded basic and neutral refractory with 4.5% dry sodium silicate | 350 | 240 | 265 |
| Graded basic and neutral refractory with 4.5% dry sodium silicate with 1% tripotassium phosphate | 975 | 625 | 430 |
| Graded basic and neutral refractory with 2.0% liquid potassium silicate | 135 | 80 | 80 |
| Graded basic and neutral refractory with 2.0% liquid potassium silicate with 1% trisodium phosphate | 300 | 230 | 175 |
| Graded basic refractory with 4.5% dry sodium silicate | 445 | 465 | 400 |
| Graded basic refractory with 4.5% dry sodium silicate with 1% trisodium phosphate | 855 | 475 | 585 |
| Special plastic refractory with 9.8% liquid sodium silicate | 580 | 365 | 355 |
| Special plastic refractory with 9.8% liquid sodium silicate with 1% trisodium phosphate | 980 | 765 | 865 |

2. Effect of additions of various phosphates and phosphoric acid to soluble silicate bonds for refractories

| Composition | Tensile strength after heating at | | |
|---|---|---|---|
| | 220° F. | 1200° F. | 2000° F. |
| Special graded neutral refractory with 4.5% dry sodium silicate | 160 | 210 | Specimens partially vitrified. |
| Special graded neutral refractory with 4.5% dry sodium silicate with 1% trisodium phosphate | 230 | 295 | Do. |
| Graded acid refractory with 14.1% liquid sodium silicate | 350 | 270 | 180. |
| Graded acid refractory with 14.1% liquid sodium silicate with 1% monosodium phosphate | 720 | 415 | 395. |
| Graded acid refractory with 14.1% liquid sodium silicate with 1% disodium phosphate | 650 | 355 | 400. |
| Special graded acid refractory with 13.1% liquid sodium silicate | 210 | 145 | 165. |
| Special graded acid refractory with 13.1% liquid sodium silicate with 1% concentrated phosphoric acid | 445 | 240 | 260. |

It will be observed that in every case, in spite of the wide variety of conditions, there is a marked increase in strength where the phosphate is used.

3. A graded basic and neutral refractory with 4.5% dry sodium silicate when heated at 220° F. gave a tensile strength of 135 pounds per square inch. The incorporation in the mixture of 1% of sodium pyrophosphate, sodium glycerophosphate and sodium hexametaphosphate respectively increases the tensile strength to 200, 180 and 290 pounds per square inch. A graded acid refractory with 14% liquid sodium silicate gave a tensile strength of 235 pounds per square inch when dried at 220° F. whereas the addition thereto of 1% trisodium phosphate increased the strength to 320.

4. A mixture of crushed firebrick and raw ground clay with 5% dry sodium silicate had a tensile strength after drying at 220° F. of 195 pounds per square inch. The mixture containing 1% trisodium phosphate had a tensile strength of 185. Substituting burnt clay for the raw clay the respective tensile strengths were 100 and 210 respectively, the addition of the phosphate more than doubling the strength of the bonded material. This illustrates that in some cases the nature of the material to be bonded may be such as, in effect, to eliminate the phosphate.

5. To illustrate the effect of the addition of a phosphate to sodium silicate used as an adhesive the following test results are given, in which one part of trisodium phosphate to nine parts of sodium silicate, as calculated to the anhydrous salts, were used, test pieces of equal size were thoroughly dried, under pressure, at 250° F. and their tensile strength determined. The great increase in strength will be noted.

| Material bonded | Nature of bond | Tensile strength |
|---|---|---|
| Asbestos paper | Sodium silicate | 44 |
| Do | Sodium silicate plus sodium phosphate | 90 |
| Unsized paper | No bond | 60 |
| Do | Sodium silicate | 77 |
| Do | Sodium silicate plus sodium phosphate | 106 |

In the preferred practice of this invention 1% of trisodium phosphate (based on the weight of material to be bonded) is added with the desired proportion of sodium silicate for the production of cements, refractory or otherwise. When the combination of alkali phosphate and soluble silicate is to be used as an adhesive it is found that the use of one part of trisodium phosphate to ten parts of sodium silicate (both calculated to the anhydrous condition) gives excellent results.

We claim:

1. As a new article of manufacture a water soluble binder consisting of an alkali silicate and not more than an equal amount of alkali phosphate.

2. As a new article of manufacture, a refractory material for furnace linings and the like, having when moistened and dried high mechanical strength, consisting of particles of refractory material and uniformly mixed therewith a soluble silicate and an alkali phosphate.

3. As a new article of manufacture, a refractory material for furnace linings and the like, having when moistened and dried high mechanical strength, consisting of particles of refractory material and uniformly mixed therewith a soluble silicate and an alkali phosphate to the extent of not more than 10% by weight of the material to be bonded.

4. As a new article of manufacture, a refractory material for furnace linings and the like, having when moistened and dried high mechanical strength, consisting of basic and neutral refractory materials, a soluble silicate binder and one-half to two percent by weight of trisodium phosphate.

5. A method of manufacturing a refractory for use at high temperatures in furnace linings and the like which consists in uniformly incorporating in refractory material a soluble silicate and a soluble phosphate.

6. A method of manufacturing a refractory for use at high temperatures in furnace linings and the like which consists in uniformly incorporating in refractory material a soluble silicate and a soluble phosphate to the extent of not more than 10% by weight.

7. A method of manufacturing a refractory for use at high temperatures in furnace linings and the like which consists in uniformly incorporating in particles of basic and neutral refractory materials a soluble silicate binder and 0.5 to 2.0% of trisodium phosphate.

NORMAN PERCY PITT.
ALAN FINDLAY GILL.